United States Patent [19]
Niepel et al.

[11] Patent Number: 6,122,504
[45] Date of Patent: Sep. 19, 2000

[54] METHOD AND SYSTEM FOR TRANSMITTING INFORMATION VIA THE RADIO INTERFACE BETWEEN A SUBSCRIBER EQUIPMENT AND A NETWORK EQUIPMENT OF A CELLULAR MOBILE RADIOTELEPHONE NETWORK

[75] Inventors: Harry Niepel; Olaf Roesler, both of Berlin, Germany

[73] Assignee: Siemens Aktiengesellschaft, Munich, Germany

[21] Appl. No.: 08/811,515

[22] Filed: Mar. 4, 1997

[30] Foreign Application Priority Data

Mar. 4, 1996 [DE] Germany ............................ 196 08 205

[51] Int. Cl.[7] ...................................................... H04Q 7/00
[52] U.S. Cl. ........................... 455/422; 455/517; 370/231; 370/394; 714/747
[58] Field of Search ..................................... 455/422, 466, 455/517; 370/242, 522, 231, 394; 371/31, 32, 33, 34; 714/747, 748, 749, 750

[56] References Cited

U.S. PATENT DOCUMENTS 4,791,639  12/1988  Afheldt et al. ........................... 370/374
5,740,189   4/1998  Tiedje ........................................ 371/53

*Primary Examiner*—Lee Nguyen
*Attorney, Agent, or Firm*—Hill & Simpson

[57] ABSTRACT

The renew characters (R1/R2 or, respectively, R1'/R2') that are entered into a transmission frame by the subscriber equipment (MS) or by the network equipment (IWF) upon setup or resetting of the information protection connection indicate a frame number of a frame that has not yet been sent or, respectively, of a frame that is guaranteed to have been received. The first numbered transmission frame (NFR) to be sent in the information transmission phase after the setup or resetting receives the frame number. As a result of the renew character, the same static starting value is not always employed for the numbering of the frames to be sent after the setup or resetting of the information protection connection. It can thus be reliably recognized whether the frame was sent before or after the setup or, respectively, resetting of the information protection connection. Despite different delays on the transmission paths that, for example, can effect a mutual overtaking of individual frames, the renew characters guarantee that an undetected information loss or, respectively, an undetected information generation does not occur at the receiver of the numbered frames. The receiver can reliably recognize the validity of the frames.

9 Claims, 1 Drawing Sheet

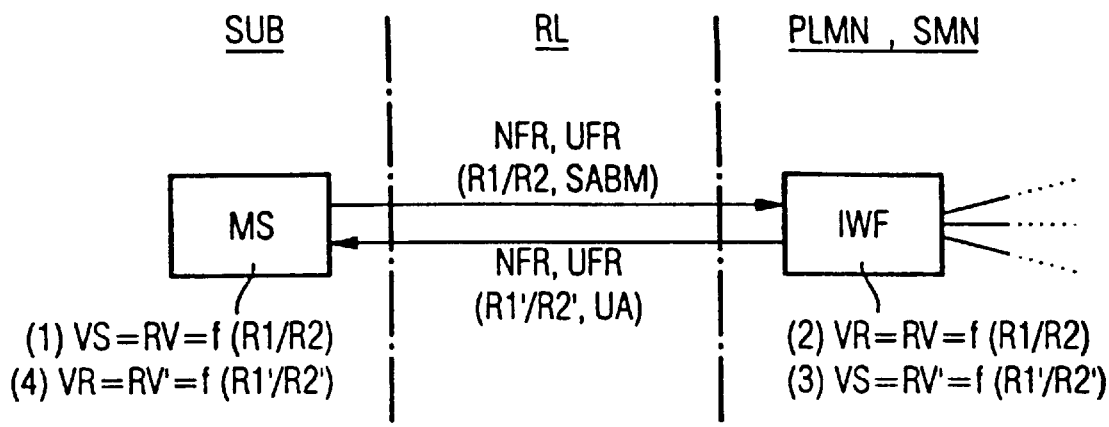
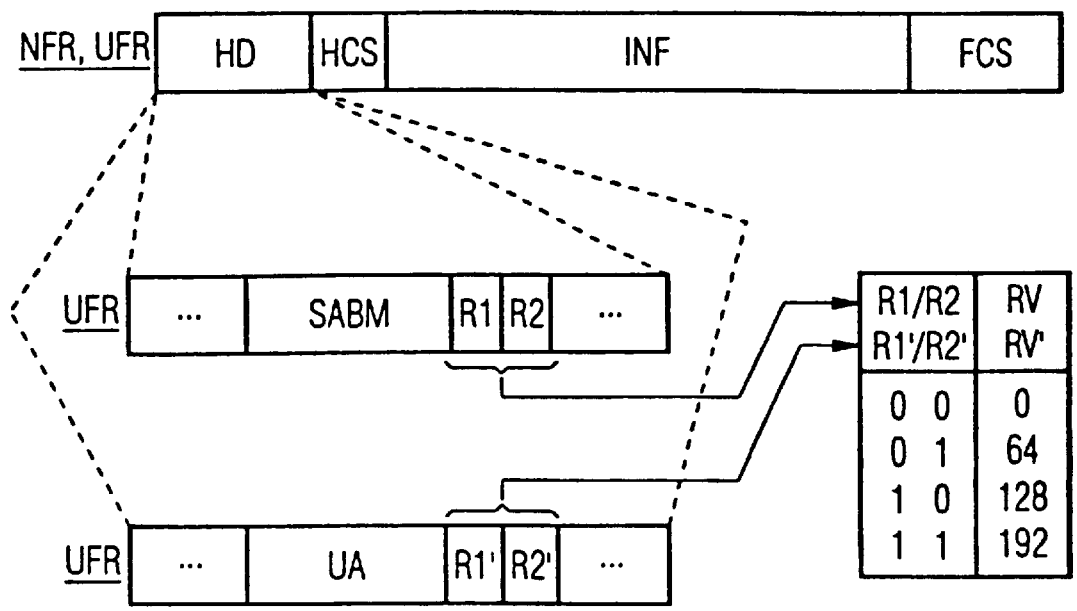

METHOD AND SYSTEM FOR TRANSMITTING INFORMATION VIA THE RADIO INTERFACE BETWEEN A SUBSCRIBER EQUIPMENT AND A NETWORK EQUIPMENT OF A CELLULAR MOBILE RADIOTELEPHONE NETWORK

BACKGROUND OF THE INVENTION

The present invention is directed to a method and system for transmitting information via the radio interface between subscriber equipment and a network.

As known, a radio interface exists between subscriber equipment and a network equipment in cellular mobile radiotelephone networks. A radio link for which the three lowest layers (layers 1 through 3) of the ISO layer model are provided is made available for information transmission in both transmission directions. The lowest layer (layer 1) supports the information transmission via physical radio channels, whereas logical radio channels such as, for example, traffic channels for the transmission of user information and control channels for the transmission of signalling information are imaged onto the physical radio channels in the connection protection layer (layer 2) lying thereabove. The connection protection layer serves the purpose of protecting the information transmission in the network layer (layer 3) lying thereabove. The logical radio channel can be differently constituted in physical terms in different cellular mobile radiotelephone networks. For example, the logical radio channel comprises a packet-switched satellite network with a plurality of network nodes or physical transmission channels combined to form bundles in a terrestrial or satellite-supported mobile radiotelephone network. Independently of the respective physical constitution, the logical radio channel is set up by the signalling via the radio interface.

A protection protocol for the radio connection is used for protected information transmission. A protection protocol (radio link protocol) for a cellular mobile radiotelephone network according to the GSM standard (Global System for Mobile Communication) is known from GSM Recommendation 04.22, Version 5.5.0, October 1995. An information protection connection can thereby be set up or reset by the subscriber equipment or the network equipment in order to subsequently broadcast a plurality of transmission frames, each of which respectively comprises a header field and an information field, via the radio interface with the radio channels in an information transmission phase. The transmission frames broadcast in the information transmission phase are usually numbered, whereby the numbering always begins with the same prescribed starting value, for example the value zero, after every setup or resetting of the information protection connection.

Given the different physical characteristic of the logical radio channel, different delays of the individual transmission frames can occur on the transmission link. When individual transmission frames are overtaken in terms of time, this leads to the fact that the frames do not arrive at the receiver in the sequence in which they were transmitted. After the setup or resetting of the information protection connection, a reliable decision cannot be made as to whether an arriving transmission frame was still set before or already sent after the setup or resetting. This potentially leads to an unnoticed loss of transmitted information and/or to an unnoticed generation of new information. The function of the protection protocol for protected information transmission is thus not assured in every instance.

SUMMARY OF THE INVENTION

It is an object of the present invention to provide a method and a system as well as a corresponding subscriber equipment and network equipment with which the function of the protection protocol is maintained in the information transmission via the air interface regardless of the physical constitution of the logical radio channel.

According to the present invention, at least one renew character with which the setup or the resetting of the information protection connection by the subscriber equipment or, respectively, by the network equipment is initiated or confirmed is entered into the header field of a transmission frame. As a result of the renew character or characters, the first numbered transmission frame to be transmitted in the information transmission phase is provided with a frame number that belongs to a numbered transmission frame that was not yet sent or that reliably reached the subscriber equipment or the network equipment before the initiation or confirmation. According to an alternative solution of the present invention, the transmission of numbered transmission frames by the subscriber equipment and by the network equipment in the information transmission phase is delayed until the transmission frames respectively transmitted before the setup or the resetting of the information protection connection have arrived.

As a result of the renew characters, which indicate a frame number of a frame that has not yet been sent or, respectively, has been reliably received, the same static starting value is not employed for the numbering of the frames to be transmitted in the information transmission phase. A reliable determination can be made as to whether the frame was sent before or after the setup or, respectively, resetting of the information protection connection. The renew characters of the present invention assure that, despite different delays on the transmission paths that, for example, can effect that individual frames are mutually overtaken, an unnoticed information loss or, respectively, an unnoticed information generation does not arise at the receiver of the numbered frames. The receiver can reliably recognize the validity of the frames. The demand for a protected information transmission via the air interface according to the protection protocol is met in this way.

It is advantageous when a transmission variable with which the frame number of the next numbered transmission frame to be transmitted in the sequence is respectively defined is set on the basis of the renew characters to a starting value for the numbering of the frames to be sent. According to another development of the present invention, the transmission variable for the numbering of the frames to be sent is set to a starting value that is composed of the renew characters themselves.

It is also advantageous when a reception variable, with which the frame number of the next numbered transmission frame arriving in the sequence is respectively defined, is set on the basis of the renew characters to a starting value for the numbering of the arriving frames. According to an alternative development of the present invention, the reception variable for the numbering of the arriving frames is set to a starting value that is composed of the renew characters themselves.

It is also advantageous when the subscriber equipment or the network equipment sends the renew character or characters in the transmission frame with a message the setup or the resetting of the information protection connection is initiated or sends the renewed character or characters back with a reply message with which an entry into the information transmission phase is acknowledged.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 is a block circuit diagram of a system for the transmission of information via the radio interface between a subscriber equipment and a network equipment of a cellular mobile radiotelephone network; and FIG. 2 depicts the structure and the content of the transmission frame that have renew characters for the identification of the frame number of the transmission frames to be sent via the radio interface.

DESCRIPTION OF THE PREFERRED EMBODIMENTS

FIG. 1 shows a radio link RL with a radio interface between subscriber equipment MS and network equipment IWF of a cellular mobile radiotelephone network. Radio channels for information transmission in both transmission directions are made available vie the radio interface. The subscriber equipment MS is composed of a radiotelephone subscriber station with which a mobile radiotelephone subscriber SUB can start calls to the network and accept calls from the network. The network equipment IWF is fashioned dependent on the nature of the cellular mobile radiotelephone network. When, for example, the cellular mobile radiotelephone network is a terrestrial mobile radiotelephone network PLMN, the network equipment is located in a mobile switching center or in a base transmission/reception station. When the cellular mobile radiotelephone network is composed of a satellite-supported mobile radiotelephone network SMN such as, for example, the iridium satellite network (see "Zukunftsmarkt satellitengestütze Mobilkommunikation" in telcom report 17 (1994), No. 5, pages 180–183), the network equipment IWF is located in the mobile switching center. The radio connections between the subscriber equipment MS and the network equipment IWF proceed over one or more satellites. The satellite-supported mobile radiotelephone network SMN, for example, is a matter of a packet-switched network wherein the information is sluiced in sections from satellite to satellite and thereby intermediately stored until a transmission path in the other transmission direction becomes free.

A protection protocol is provided for protecting the information that is transmitted over the air from the subscriber equipment MS to the network equipment IWF as well as from the network equipment IWF to the subscriber equipment MS. According to the protection protocol, an information protection connection is set up or reset in order to subsequently successively send the information via the radio channel or channels in an information transmission phase. The setup or the resetting of the information protection connection is initiated by one of the two equipment communicating with one another via the radio interface, either by the subscriber equipment MS or by the network equipment IWF in the present example, and is acknowledge by the other of the two equipment.

The user information and/or signalling information is transmitted in numbered transmission frames NFR during the information transmission phase. Over and above this, control information can be sent in unnumbered transmission frames UFR, for example for setting up or resetting an information protection connection. Each transmission frame NFR, UFR comprises at least a header field and an information field. What the content of the header field reveals, among other things, is whether an unnumbered or a numbered transmission frame is involved and whether user information/signalling information or control information are contained in the information field.

For reliable recognition of the validity of the transmitted transmission frame at the receiver, for example the network equipment IWF, renew characters R1/R2 (restart bits) that are composed of two bits in the present example are entered into the header field of a transmission frame, the setup or, respectively, the resetting of the information protection connection being started with these by the sender, for example the subscriber equipment MS. The setup or, respectively, resetting can likewise be begun by the network equipment IWF and acknowledged by the subscriber equipment MS. In the present example, an unnumbered transmission field UFR comprises the renew characters R1/R2 in the header field. A message SABM (Set Asynchronous Balance Mode command) is sent from the subscriber equipment MS to the network equipment IWF in the header field of the unnumbered transmission frame UFR together with the renew characters R1/R2. Due to the renew characters R1/R2, the first numbered transmission frame NFR to be sent in the information transmission phase after the setup or resetting of the information protection connection is provided with a frame number that belongs to a numbered transmission frame NFR that was not yet sent. It is also possible to allocate a frame number with the renew characters that belongs to a numbered transmission frame NFR that was already sent but is guaranteed to have already reached the receiver before the initiation or acknowledgment of the setup or, respectively, resetting of the information protection connection. This means that the transmission frame identifiable by the frame number is no longer on the transmission link between sender and receiver.

Dependent on the renew characters R1/R2, the subscriber equipment MS sets a transmission variable VS to a starting value RV for the numbering of the frames to be sent. The transmission variable VS defines the frame numbers of the numbered transmission frames NFR that are successively transmitted in sequence in the information transmission phase. The transmission variable VS or, respectively, the starting value RV is a function f(R1/R2) (1) dependent on the renew characters R1/R2. It is also possible to use the renew characters not as index for defining the start value RV but select the renew characters themselves for the transmission variable VS and to thus determine the frame number of the next transmission frame to be sent.

When the network equipment IWF has the possibility of entering into the information transmission phase or, respectively, of continuing the information transmission phase, it likewise enters renew characters R1'/R2' in the header field of the unnumbered transmission frame UFR and returns these to the subscriber equipment MS together with an answer message UA. With the answer message UA, the network equipment IWF acknowledges that it can begin or continue the information transmission phase. Previously, a reception variable VR with which the frame number of the next transmission frame NFR arriving in the sequence is respectively defined is first set with reference to the received renew characters R1/R2 to the starting value RV for the numbering of the arriving frames. The reception variable VR or, respectively, the starting value RV is also a function f(R1/R2) (2) dependent on the renew characters R1/R2. Subsequently, the network equipment IWF sets (3) the transmission variable VS to a starting value RV' for the numbering of the frames to be sent that is defined by its own renew characters R1'/R2'. This yields VS=RV'=f(R1'/R2'). The subscriber equipment MS sets its reception variable VR to the starting value RV' sent from the network equipment IWF, this starting value RV' being characterized (4) by the arriving renew characters R1'/R2'. VR=RV'=f(R1'/R2') follows therefrom.

In an alternative solution, the transmission of the numbered transmission frames in the information transmission phase of sender and receiver, that is, of the subscriber equipment MS and of the network equipment IWF, is delayed until the numbered transmission frames NFR respectively sent before the setup or resetting of the information protection connection are sure to have arrived in the respective equipment.

FIG. 2 shows the identical frame structure of an unnumbered transmission frame UFR and of a numbered transmission frame NFR. Each transmission frame comprises at least one header field HD (header) as well as an information field INF. In addition, there is also potentially a header check field HCS and a frame check field FCS. The control information for identifying the frame type as well as a transmission mode are contained in the header field HD, whereas the user information such as voice and data or the signalling information is entered into the information field INF. The header check field HCS or, respectively, the frame check field FCS serves the purpose of checking the information contained in the header field HD or, respectively, in the entire frame.

Upon setup or when resetting the information protection connection, the renew character or characters R1/R2 together with the message SABM are entered into the header field HD of the unnumbered transmission frame UFR by the transmitting equipment, by the subscriber equipment in the present example of FIG. 1. As a result of the renew characters R1/R2 of the present invention, the first numbered transmission frame to be sent in the information transmission phase after the setup or resetting of the information protection connection is provided with a frame number that belongs to a transmission frame that was not yet sent or that was sure to have reached the subscriber equipment or the network equipment before the initiation or acknowledgment. An encoding of the renew characters R1/R2 can thereby ensue such that a starting value RV=0 is set given binary renew characters R1/R2=00, the starting value RV=64 is set given R1/R2=01, the starting value RV=128 is set given R1/R2=10 and the starting value RV=192 is set given the binary renew characters R1/R2=11, being respectively set as frame number for the first numbered transmission frame to be sent in the information transmission phase. For the present example, the value RV is located between the current value of the transmission variable and a value that derives from the sum of the current value of the transmission variable and the fixed value 63, that is, VS<RV<VS+63.

Likewise, renew characters R1'/R2' are inserted into the header field of the unnumbered transmission frame UFR together with the answer message upon setup or resetting of the information protection connection, being inserted by the receiving equipment, the network equipment in the present example according to FIG. 1. The encoding of the renew characters R1'/R2' preferably ensues in the same way as the encoding of the renew characters R1/R2. The values 0, 64, 128 or 192 corresponding to the binary renew characters R1'/R2'=00, 01, 10 or 11 thus derive for the starting value RV' that indicates the frame number of the next transmission frame to be sent or, respectively, arriving in the sequence.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting information via a radio interface between subscriber equipment and network equipment of a cellular mobile radiotelephone network, comprising the steps of:

transmitting information to the radio interface by a radio link and protecting the information with a protection protocol;

setting up or resetting of an information protection connection by the subscriber equipment or by the network equipment in order to subsequently successively transmit transmission frames, each of the frames having a header field and an information field;

providing at least one renew character, which provides the first numbered transmission frame to be sent with a frame number that is a function of the at least one renew character, is respectively entered into the header field of a transmission frame for respectively initiating or acknowledging the setup or resetting of the information protection connection, said frame number belonging to a numbered transmission frame that was not yet sent or that is sure to have reached the subscriber equipment or the network equipment before initiation or acknowledgment of the setting up or resetting.

2. The method according to claim 1, wherein a transmission variable, which determines the frame number of the next numbered transmission frame to be sent in the sequence, is set with reference to the renew characters to a starting value for numbering of frames to be sent.

3. The method according to claim 1, wherein a transmission variable, which determines the frame number of the next numbered transmission frame to be sent in the sequence, is set with reference to the renew characters to a starting value for numbering of frames to be sent that is composed of the renew characters themselves.

4. The method according to claim 1, wherein a reception variable, which determines the frame number of the next numbered transmission frame to be received in the sequence, is set with reference to the renew characters to a starting value for numbering of arriving frames.

5. The method according to claim 1, wherein a reception variable, which determines a frame number of a next numbered transmission frame to be received in a sequence, is set with reference to the renew characters to a starting value for numbering of arriving frames is composed of the renew characters themselves.

6. The method according to claim 1, wherein the renew characters are respectively sent by the subscriber equipment or by the network equipment in the transmission frame together with a message with which the setup or the resetting of the information protection connection is initiated or are sent back together with an answer message which acknowledges an entry into the information transmission phase.

7. A system for transmitting information via a radio interface between subscriber equipment and network equipment of a cellular mobile radiotelephone network using a protection protocol for protecting the information transmitted to the radio interface via a radio link, comprising:

each of the subscriber equipment and the network equipment having a system for setting up or for resetting of an information protection connection in order to subsequently successively transmit transmission frames, each of the frames having a header field and an information field, in an information transmission phase;

at least one renew character, which provides a first numbered transmission frame to be sent with a frame number allocated thereto that is a function of the at least one renew character, the character being respectively entered into the header field of a transmission frame for respectively initiating or acknowledging the setup or resetting of the information protection connection, said frame number belonging to a numbered transmission frame that was not yet sent or that is sure to have reached the subscriber equipment or the network equipment before initiation or acknowledgment of the setting up or resetting.

8. Subscriber equipment for transmitting or, respectively, receiving information via a radio interface to or, respectively, from network equipment of a cellular mobile radiotelephone network using a protection protocol for protecting the information transmitted to the radio interface via a radio link, comprising:

system for setting up or for resetting of an information protection connection in order to subsequently successively transmit transmission frames that is a function of the at east one renew character, each of the frames having a header field and an information field, in an information transmission phase;

system in the subscriber equipment for entering at least one renew character, which provides the first numbered transmission frame to be sent with a frame number allocated thereto, into the header field of a transmission frame for respectively initiating and acknowledging the setup or resetting of the information protection connection, said frame number belonging to a numbered transmission frame that was not yet sent or that is sure to have reached the subscriber equipment or the network equipment before initiation or acknowledgment of the setting up or resetting.

9. Network equipment of a cellular mobile radiotelephone network for transmitting or, respectively, receiving information via a radio interface to or, respectively, from subscriber equipment using a protection protocol for protecting the information transmitted to the radio interface via a radio link, comprising:

system for setting up or for resetting of an information protection connection in order to subsequently successively transmit transmission frames, each of the frames having a header field and an information field, in an information transmission phase;

system in the network equipment for entering at least one renew character, which provides the first numbered transmission frame to be sent with a frame number allocated thereto that is a function of the at least one renew character, into the header field of a transmission frame for respectively initiating and acknowledging the setup or resetting of the information protection connection, said frame number belonging to a numbered transmission frame that was not yet sent or that is sure to have reached the subscriber equipment or the network equipment before initiation or acknowledgment of the setting up or resetting.

* * * * *